March 21, 1961 L. A. WILLS Re. 24,950

SANITARY SIPPING-STRAW DISPENSER

Original Filed March 5, 1956

INVENTOR

Leonard Atlee Wills

United States Patent Office

Re. 24,950
Reissued Mar. 21, 1961

24,950

SANITARY SIPPING-STRAW DISPENSER

Leonard Atlee Wills, 3125 38th St. NW., Washington, D.C.

Original No. 2,828,887, dated Apr. 1, 1958, Ser. No. 569,371, Mar. 5, 1956. Application for reissue June 18, 1958, Ser. No. 742,966

14 Claims. (Cl. 221—192)

Matter enclosed in heavy brackets [ ] appears in the original patent but forms no part of this reissue specification; matter printed in italics indicates the additions made by reissue.

The object of my invention is to provide a sanitary sipping-straw dispenser that will reliably deliver a straw at each operation of the ejector mechanism with ease of operation and permit a simple construction with few inexpensive parts so it will be of low cost for primary use in restaurants and soda fountains.

The invention consists of a sanitary sipping-straw dispenser comprising a jar which may be of transparent glass or plastic for holding a quantity of straight sipping straws and protecting them from sources of contamination; an ejector mechanism inside the jar for engaging a straw and lifting it so a portion of its length will be above the top of the jar available for grasping by hand; a downwardly funnel-shaped cup with an aperture or slot at the vertex with said cup mounted and supported within and at bottom of the jar for the purpose of positioning the bottom ends of the straws so as to make them accessible for ejection; an upwardly funnel-shaped removable top with an aperture at the vertex and straw retaining springs attached thereto, the purpose of the top being to guide the top end of a straw while the straw is being lifted by the ejector as well as providing a lid for the jar and the retaining springs for the purpose of retaining the straw until it is withdrawn by hand and if two straws are ejected to permit the second straw to fall back into the jar; and a plug to close the aperture or slot in the cup when the ejector is in an upward position and a spring to push the plug into the aperture, the purpose of the plug being to keep bottom ends of the straws away from above the aperture in the cup so they will not be in the way of the engaging portion of the ejector moving downward through the aperture.

Some of the advantages of the invention are that the jar may be of transparent glass or plastic for viewing of the straws, the jar may be heavy and short enough to give the dispenser stability, and straws are encased in a sanitary container. The grasp knob is at the top of the device and requires a natural lifting motion for operation. The complete assembly inside the jar may be lifted from the jar for cleaning purposes. The assembly being completely detachable from the jar permits replacement of either independently of the other, or the assembly may be used as a straw dispenser attachment in other existing jars.

An embodiment of my invention is described and explained in the description and drawings. The following is a brief description of the several views of the drawings.

Figure 1:
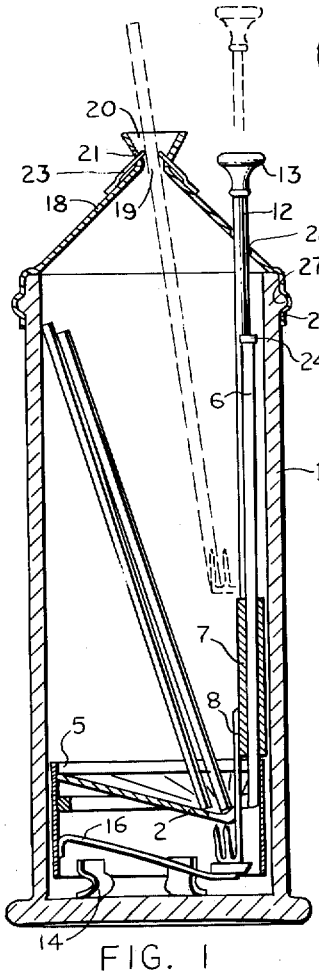
Figure 1 is a central longitudinal vertical section of the dispenser.
Figure 6:
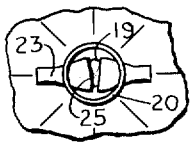
Figure 6 is a plan view of the retaining springs attached to a fragmentary portion of the top.
Figure 2:
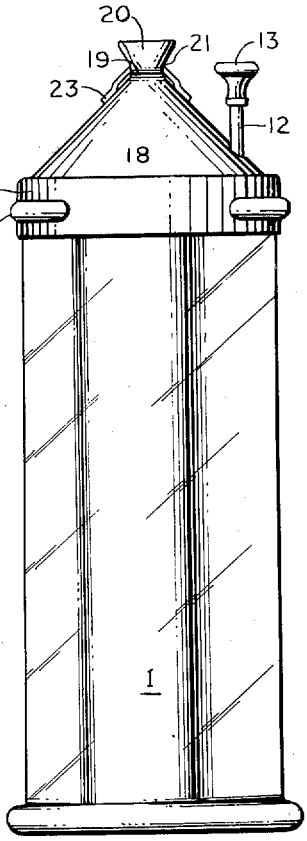
Figure 2 is an outline view of the dispenser.

A detailed description is given so that the construction, operation, and features of the invention may be clearly understood:

In carrying my invention into effect a cylindrical transparent glass or plastic jar 1, shown in Figs. 1 and 2, of proper size and shape is employed. Near outside top of jar two protrusions 27 are formed in the jar over which the indentations 26 in the flange 22 of top 18 may be clamped, holding the top tightly onto jar and properly orientating it angularly.

Figure 4:
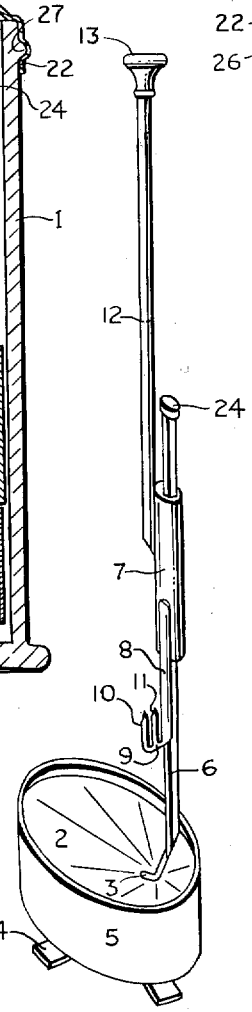
Figure 4 is a perspective view of the straw-positioning cup and frame and support springs and the ejector mechanism.
Figure 5:
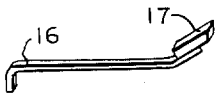
Figure 5 is a detail perspective view of the closure plug with its return spring.
Figure 3:
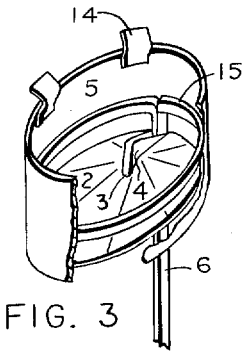
Figure 3 is a perspective view of bottom of the straw-positioning cup, support springs, and fragmentary portions of frame and guide.

At bottom of jar 1 is a downwardly funnel-shaped straw-positioning cup 2, shown in Figs. 1, 3, and 4, of proper thickness and with the periphery of the cup held in a horizontal position a short distance above the bottom of the jar by the mounting frame 5 which is a relatively thin walled cylinder of proper height with its outside diameter slightly less than the inside diameter of the jar. The straw-positioning cup 2 has an aperture 3 or slot at the vertex which is narrow enough to prevent straws from falling through.

A guide 6, shown in Figs. 1, 3, and 4, standing vertically like a post near wall of jar, is attached at bottom to the frame 5 by permitting the extension 15 of guide 6 to encircle the inside circumference of the frame 5 to make a sturdy assembly. The guide 6 extends down through the cup 2 at edge of the aperture 3. The top of the vertical guide 6 extends nearly to top of the jar and is headed 24 to form a stop for the slide 7, shown in Figs. 1 and 4.

The ejector, shown in Figs. 1 and 4, comprises a slide 7, a slender vertical rod 8, a short slender horizontal bar 9, and engaging pins 10 and 11. The slide 7 is a straight cylindrical length of tube of proper thickness and has an inside square cross-sectional opening to match the cross-section of guide 6. The two short upright engaging pins 10 and 11 have smooth tips, are spaced approximately a straw-diameter apart, and are slightly tilted to opposite side of the jar from their upright position. The short horizontally positioned bar 9 connects the bottom ends of the two pins 10 and 11 to the lower end of the vertically positioned slender rod 8. The top of the rod 8 is attached to the slide 7 which slides on the guide 6. Of course the pieces 10, 11, 9, and 8 may be of integral material such as wire bent and fashioned as described. The pins 10 and 11 are located so the tips of the pins will be a short distance below the aperture 3 in the cup 2 when the ejector is at bottom position, and pins are so aligned that they may pass through the aperture without interference. The ejector is kept aligned angularly because the square cross-sectional opening of the slide 7 being mated with the cross-section of the guide 6 does not permit angular relative motion of the parts.

A lifting rod 12, shown in Figs. 1 and 4, extends vertically down through a hole 28 in the top 18 near the inside edge of the jar, and the bottom end of the rod 12 is attached to the slide 7. A grasp knob 13, shown in views 1, 2, and 4, is attached at top of the lifting rod 12 outside of the jar.

The purpose of the straw-positioning cup 2 is to position the straws over the aperture 3 with bottom ends of the straws close together so the engaging pins 10 and 11 may move up through the aperture 3, engage one or two straws, and lift same so a portion of the length extends above the top of the device for grasping by hand.

The most important features of the invention are the shape of the positioning cup 2, including the size and location of the aperture 3; and the shape, size, spacing, position, and number of engaging pins on the ejector. The positioning cup 2 being funnel-shaped causes the bottom ends of the straws in the jar to be funneled to the vertex of the cup by force of gravity, and the bottom ends of the straws will be pressed closely together above the aperture 3 which is narrow enough that the straws will not fall through. By having the bottom ends of the straws together and having two engaging pins properly spaced, shaped, and positioned, moving up through the aperture makes it almost certain that the bottom end of a straw will be engaged by an engaging pin. By having the vertex of cup 2 near the side of the jar, the top ends of the straws fall to opposite side of the jar; and in this manner the straws tend to arrange themselves parallel to each other, and movement of bottom ends of straws on the cup toward the aperture is facilitated. Also, the engaging pins engage and eject the straws closest to that side of the jar, thereby permitting movement of straws toward the aperture from only one direction for the most part; whereas if the aperture was at the center of a conical cup, the straws would move up from all directions and tend to stand each other away, allowing a vacant space to occur above the aperture into which a single pointed engaging plunger would be raised. Several small support springs 14 are attached and spaced around inside edge of the bottom of the frame 5, holding the mounting frame a short distance from the bottom of the jar. As the moving parts of the ejector mechanism 7, 8, 9, 10, 11, 12, and 13, fall by the force of gravity to the bottom position; the bottom of the slide 7 strikes the top edge of the frame 5, which is supported on the springs 14, and the entire assembly is jarred. This jar agitates the straws resting on the cup 2. As it is the nature of straws to fail to slide occasionally when resting on a funnel-shaped smooth surface under static forces of their own weight, agitation may be necessary to get them moving again; and, if so, it is available when needed.

The upwardly funnel-shaped top 18, shown in Figs. 1 and 2, guides the top ends of the straws through the aperture 19 at the vertex as the straws are lifted by the ejector. The top has a vertically downward extended flange 22 at its periphery which has two indentations 26 so shaped and located to mate with the protrusions 27 on outside top end of the jar. The discharge spout 20 is flared to provide a guard to keep user's hand away from the aperture area. Two flat cantilever retaining springs 23 secured on exterior of the top and on opposite sides of the aperture 19 extend through slots 21 in flared portion of discharge spout and clasp the straw on its exit, and the contact edges 25 of the springs being roughened retain the straw from falling back into the jar as the ejector is released. The contact edges 25 of the retaining springs 23 are straight and at a slight horizontal angle to each other. Should two straws be lifted through the aperture 19 in the top, one straw on each engaging pin; the contact edges of the retaining springs being straight and at a slight horizontal angle to each other will clasp only one straw, the straw at the position where the edges of the springs are closer together, and allow the other straw, the straw on the other side where the edges 25 of the springs 23 are farther apart, to fall back into the jar upon release of the ejector. Thereby the dispenser is made to deliver only one straw at each operation.

The closure plug 17 is a small block of material attached to the end of a cantilever spring 16, other end of the cantilever spring being attached to the inside lower edge of the frame 5 on the opposite side of the jar. The plug is allowed to ride up with the bottom edge of the ejector, bar 9, and close the aperture 3 and slightly raise the ends of the straws above the edges of the aperture. Edges of the aperture are flared downward to form guides for the closure plug 17, and this also leaves smooth edges at the aperture. On the downward movement of the ejector, the bottom end of the ejector, bar 9, pushes the plug 17 out of the aperture 3, allowing the straws to slide over the aperture after the ejector has passed through.

The operation of my device is as follows:

The top 18 is removed from the jar 1, and the jar is filled with straws and then the top is replaced. The bottom ends of the straws rest against the cup 2. The cup 2 being funnel-shaped causes the bottom ends of the straws to move over the aperture 3 with ends close together. As the grasp knob 13 is lifted by a person, the lifting rod 12 causes the slide 7 to slide up on the guide 6, causing the pins 10 and 11 to move up through the aperture 3; and the chances are that only one pin will enter the opening in the bottom of a straw. The bottom edge of the straw engaged will rest against the horizontal bar 9 and be lifted thereby to a position where a portion of the straw is above the top of the container available for grasping by hand. The pins enter the open bottom end of the straws and extend up into the straws the height of the pins, thereby, erecting the straws engaged. As the top of a straw moves up, it is guided by the upwardly funnel-shaped top 18 through the aperture 19 at the vertex. The retaining springs 23 clasp the straw on its exit and retain it from falling back into the jar as the ejector is released. Occasionally two straws are engaged, one by each pin. In this case the contact edges of the retaining springs being straight and at a slight horizontal angle to each other will clasp only one straw and allow the other straw to fall back into the jar upon release of the grasp knob. As the ejector moves up, the closure plug 17 rides up with the bottom of the ejector, bar 9, and closes the aperture 3. When the grasp knob 13 is released, the bottom of the slide 7 strikes the top edge of the frame 5, jarring the assembly of which the cup is a part and thereby agitating the straws. The engaging pins move down between the straws, and the horizontal bar 9 pushes the closure plug 17 down out of the aperture 3, and the bottom ends of the straws slide back in over the aperture 3. The device is then ready to be operated again.

I desire that it be understood that various alterations in the details of construction may be made to the specific embodiment of my invention illustrated and described without departing from the scope of the invention.

What I claim and desire to secure by Letters Patent is:

1. A sanitary sipping-straw dispenser of the character described comprising a jar adapted to contain straws standing on end therein, a removable upwardly funnel-shaped top with an aperture at the vertex with said funnel-shaped top adapted to guide the ends of straws being lifted by an ejector into said aperture for exit, a downwardly funnel-shaped cup with an aperture at the vertex, said aperture being narrow enough to prevent straws from falling through but wide enough to permit a portion of the ejector to pass through, said vertex being located near the periphery of the cup and said cup being located within and at the bottom of the jar and said funnel-shaped cup adapted to position straws over said aperture by gravity funneling the straws to said aperture, a straight guide vertically positioned within the jar, an ejector with a first portion thereof slidable on and guided by said guide and a second portion extending from said first portion with two upright pins at the other end with said pins positioned and aligned to pass through the aperture in the cup and each said pin adapted to engage the bottom end of a straw that is positioned above the aperture in the cup and said second portion of the ejector adapted to lift said engaged straws into the aperture in the top, means by which the user may actuate said ejector, two similar cantilever springs attached to the top on opposite sides of said aperture having rough straight clasping edges at a slight horizontal angle to each other with said clasping edges positioned immediately above the aperture and projecting into the path of the straw or straws being lifted through the aperture in the top so that a single straw will cause said springs to deflect creating a spring force that will retain said straw and prevent it from falling by its own weight back into jar and said clasping edges at an angle to each other causing only the straw on the side where the edges are closer together to be clasped and retained when two straws are lifted into the aperture in the top, and a closure plug adapted to fit into the aperture in the cup from the bottom side to hold the straws slightly above the edges of the aperture so that the engaging portion of the ejector may push said straws aside and pass down through said aperture thus preventing the engaging portion of the ejector from crushing the end of a straw against the edge of said aperture when trying to pass down through said aperture, and a spring adapted to push said closure plug upward.

2. A sanitary sipping-straw dispenser of the character described comprising a jar adapted to contain straws standing on end therein, a removable upwardly funnel-shaped top with an aperture at the vertex with said funnel-shaped top adapted to guide the ends of straws being lifted by an ejector into said aperture for exit, a downwardly funnel-shaped cup with an aperture at the vertex, said aperture being narrow enough to prevent straws from falling through but wide enough to permit a portion of the ejector to pass through, said vertex being located near the periphery of the cup and said cup being located within and at the bottom of the jar and said funnel-shaped cup adapted to position straws over said aperture by gravity funneling the straws to said aperture, a straight guide vertically positioned within the jar standing like a post with its bottom end attached to other parts positioned at the bottom of the jar for its support, an ejector with a first portion thereof slidable on and guided by said guide and having a cross-section mated with the cross-section of said guide so that relative angular movement of the two parts is prohibited and a second portion extending from said first portion with two upright pins at the other end with said second portion positioning said pins so the tips of the pins will be a short distance beneath the cup and said pins aligned to pass through said aperture in the cup without interference when said ejector is at its bottom position and each said pin being adapted to engage the bottom end of a straw that is positioned above the aperture in the cup and said second portion of the ejector being adapted to lift the engaged straws into the aperture in the top so that they may be grasped by hand, a rod vertically positioned and extending through a hole in the top near the inside edge of the jar and above the ejector and said rod having a grasp knob at its upper end which is outside of the jar and the other end of said rod being attached to the first portion of the ejector and said rod adapted to move in both vertical directions providing means for the user to actuate the ejector, two similar cantilever springs attached to the top on opposite sides of the aperture having rough straight clasping edges at a slight horizontal angle to each other with said clasping edges positioned immediately above the aperture and projecting into the path of the straw or straws being lifted through the aperture in the top so that a single straw will cause said springs to deflect creating a spring force that will retain said straw between the springs and prevent same from falling by its own weight back into the jar and said clasping edges being at a slight horizontal angle to each other causing only the straw on the side where the edges are closer together to be clasped between the edges of the two springs and retained when two straws are lifted into the aperture in the top, and a closure plug adapted to fit into the aperture in the cup from the bottom side to hold the straws slightly above the edges of the aperture so that a portion of the ejector may push said straws aside and pass down through said aperture thus preventing the second portion of the ejector from crushing the end of a straw against the edge of said aperture, and a spring adapted to supply a force to push said plug into the aperture of the cup from the bottom side of the cup as the ejector moves upward.

3. A sanitary sipping-straw dispenser of the character described comprising a jar adapted to hold a quantity of straws standing on end therein, a removable upwardly funnel-shaped top with an aperture at the vertex with said funnel-shaped top adapted to guide the top ends of straws being lifted by an ejector into said aperture for exit, a downwardly funnel-shaped cup with an aperture at the vertex, said aperture being narrow enough to prevent straws from falling through but wide enough to permit a portion of an ejector to pass through, said vertex being located near the periphery of the cup and said cup located within and at the bottom of the jar and said funnel-shaped cup adapted to position straws over said aperture by gravity funneling the straws to said aperture, a straight guide vertically positioned within the jar standing like a post with its bottom end attached to other parts within and at the bottom of the jar for its support, an ejector with a first portion thereof slidable on and guided by said guide and having a cross-section mated with the cross-section of said guide so that relative angular movement of the two parts is prohibited and a second portion extending from said first portion with two upright pins at the other end with said second portion positioning said pins so that the tips of said pins will be a short distance beneath the cup when the ejector is at its bottom position and aligning said pins to pass through the aperture in the cup without interference and each said pin being adapted to engage the bottom end of a straw that is positioned above the aperture in the cup and said second portion of the ejector being adapted to lift the engaged straws into the aperture in the top so that they may be grasped by hand, a rod vertically positioned and extending through a hole in the top near the inside edge of the jar and above the ejector and said rod having a grasp knob at its upper end which is outside of the jar and the other end of said rod being attached to the first portion of the ejector and said rod adapted to move in both vertical directions providing means for the user to actuate the ejector, two similar cantilever springs attached to the top on opposite sides of the aperture having rough straight clasping edges at a slight horizontal angle to each other with said clasping edges positioned immediately above the aperture and projecting into the path of the straw or straws being lifted through the aperture in the top so that a single straw will cause said springs to deflect creating a spring force that will retain said straw beinween the edges of the two springs and prevent it from falling by its own weight back into the jar and said clasping edges being at a slight horizontal angle to each other causing only the straw on the side where the edges are closer together to be clasped and retained when two straws are lifted into the aperture in the top, a closure plug adapted to fit into the aperture in the cup from the bottom side to hold the straws slightly above the edges of the aperture so that a portion of the ejector may push said straws aside and pass down through said aperture thus preventing a portion of the ejector from crushing the end of a straw against the edge of said aperture, a spring adapted to supply a force to push said plug into the aperture of the cup from the bottom side of the cup as the ejector moves upward, a guard attached to the top being positioned a short distance above the aperture and having an inside circumference large enough that does not interfere with ejected straws and being adapted to keep the user's hands from coming in contact with the aperture area, and a spring or springs resting on the inside bottom of the jar acting as supports for the assembly of which the cup is a part and being adapted to allow said assembly to oscillate or jar when said assembly receives an impact by the falling ejector and the parts attached thereto and moving therewith the ejector.

4. A straw dispenser attachment adapted to fit inside an open top jar comprising a downwardly funnel-shaped cup with an aperture at the vertex, said aperture being narrow enough to prevent straws from falling through but wide enough to permit a portion of the ejector to pass through with said vertex located near the periphery of the cup and said funnel-shaped cup adapted to position the bottom ends of straws over said aperture by gravity funneling the straws to said aperture, a straight guide vertically positioned at the edge of the cup and near the aperture and standing like a post with its bottom end attached to or in conjunction with said cup for its support, an ejector with a first portion thereof slidable on and guided by said guide and having a cross-section mated with the cross-section of said guide so that relative angular movement of the two parts is prohibited and a second portion extending from said first portion with two upright pins at the other end with said second portion positioning said pins so that the tips of said pins will be a short distance beneath the cup when the ejector is at its bottom position and aligning said pins to pass through the aperture in the cup without interference and each said pin being adapted to engage the bottom end of a straw that is positioned above the aperture in the cup and said second portion of the ejector being adapted to lift the engaged straw or straws into the aperture in the top, a rod vertically positioned and extending through a hole in the top and said rod having a grasp knob at its upper end and the other end of said rod being attached to the first portion of the ejector and said rod adapted to move in both vertical directions providing means for the user to actuate the ejector, a closure plug adapted to fit into the aperture in the cup from the bottom side to hold the straws slightly above the edges of the aperture so that a portion of the ejector may push said straws aside and pass down through said aperture, a spring adapted to supply a force to push said plug into the aperture of the cup from the bottom side of the cup as the ejector moves upward, a spring or springs attached to the cup or to the assembly of which the cup is a part and acting as supports for the assembly when resting on the inside bottom of a jar and said springs being adapted to allow said assembly to oscillate or jar when said assembly receives an impact by the falling ejector and parts attached to said ejector, an upwardly funnel-shaped top adapted to guide the top ends of the straw being lifted by the ejector into an aperture at the vertex so that a portion of the straw will be above the top accessible for grasping by hand and said top having a flange extending downwardly from its periphery and said flange being adapted to fit onto the top of an open top jar so that it may be readily removed and replaced, two similar cantilever springs attached to the top on opposite sides of the aperture having rough straight clasping edges at a slight horizontal angle to each other with said clasping edges positioned immediately above the aperture and projecting into the path of the straw or straws being lifted through the aperture in the top so that a single straw will cause said springs to deflect creating a spring force that will retain said straw between the two springs and prevent it from falling by its own weight back into the jar and said clasping edges being at a slight horizontal angle to each other causing only the straw on the side where the edges are closer together to be clasped and retained when two straws are lifted into the aperture in the top, and a guard attached to the top being positioned a short distance above the aperture in the top and having an inside circumference large enough that it does not interfere with the straws being ejected and said guard being adapted to keep the user's hand from coming in contact with the aperture area in the top.

*5. A straw dispenser attachment comprising a downwardly funnel-shaped positioning cup with an aperture at its vertex, said vertex being located near the periphery of said cup and said cup being adapted to position the bottom ends of straws over said aperture by gravity, funneling the bottom ends of the straws toward said aperture, a straight guide having a non-circular cross-section and vertically positioned at the edge of the cup adjacent the aperture with its bottom end attached to said cup, an ejector having a tubular first portion slidable on and guided by said guide and having a non-circular cross-section mated with the cross-section of said guide to prevent relative angular movement of said first portion with respect to said guide, said ejector having a second portion extending from the first portion and provided with upstanding pin means, said second portion being arranged so that said pin means is a short distance beneath the cup when the ejector is at its bottom position and aligning said pin means so that it may pass through the aperture in the cup, said pin means being adapted to engage the bottom end of a straw positioned above the aperture in the cup, said second portion being formed and arranged to lift the engaged straw, means to actuate said ejector, said tubular portion being engageable with the cup to deliver an impact thereto responsive to downward movement of said ejector, whereby to cause said cup to oscillate, and spring means secured to and depending from said cup to resiliently support the cup and being adapted to allow said cup to oscillate responsive to an impact received thereby, whereby straws supported on said cup will be agitated and will tend to gravitate toward the vertex of the cup.*

*6. A sanitary sipping-straw dispenser of the character described comprising a jar adapted to contain straws standing on end therein, a removable upwardly funnel-shaped top on the jar with an aperture at the vertex thereof, said top being adapted to cammingly guide the top ends of straws upwardly into said aperture, a downwardly funnel-shaped cup in the jar below said top, said cup having an aperture at its vertex, said last-named aperture being narrow enough to prevent straws from falling through, said vertex of the cup being located near the periphery of the cup and in the lower portion of the jar and said cup being adapted to position straws over said last-named aperture by gravity, funneling the straws to said last-named aperture, a straight guide vertically positioned within the jar, an ejector with a tubular first portion slidably mounted on and guided by said guide and a second portion extending from said first portion and provided with upright pin means at its end, said upright pin means being positioned and aligned to pass through said last-named aperture and being formed and arranged to engage the bottom end of a straw positioned above said last-named aperture, said second portion of the ejector being adapted to lift said engaged straw into the aperture in the top, means for actuating said ejector, said tubular portion being located so as to engage with the cup to deliver an impact thereto responsive to downward movement of said ejector, whereby to cause said cup to oscillate, and spring means engaging the interior of the jar and resiliently supporting the cup and the assembly associated therewith and being adapted to allow said cup and assembly to oscillate responsive to an impact received thereby, whereby straws supported on said cup will be agitated and will tend to gravitate toward the vertex of the cup.*

*7. A sanitary sipping-straw dispenser of the character described comprising a jar adapted to contain straws standing on end therein, a removable upwardly funnel-shaped top on the jar, said top having a substantially centrally located vertex with an aperture at the vertex, said top being adapted to cammingly guide the top ends of straws upwardly into said aperture, a downwardly funnel-shaped cup with an aperture at its vertex, means mounting the cup in the jar below the top, said last-named aperture being narrow enough to prevent straws from falling through, said vertex of the cup being located near the periphery of the cup and in the lower portion of the jar and said cup being adapted to position straws*

*over said last-named aperture by gravity, funneling the straws to said last-named aperture, a straight guide vertically positioned within the jar, an ejector with a tubular first portion surrounding, slidably mounted on, and guided by said guide and a second portion extending from said first portion through said last-named aperture and provided with upright pin means at its end, said upright pin means being positioned and aligned to pass through said last-named aperture and being formed and arranged to engage the bottom end of a straw positioned above said last-named aperture, said second portion of the ejector being adapted to lift said engaged straw into the aperture in the top, means for actuating said ejector, said tubular portion being located so as to engage with the cup to deliver an impact thereto responsive to downward movement of said ejector, whereby to cause said cup to oscillate, and means attached to the top adjacent the aperture therein and projecting into the path of a straw being lifted therethrough and being formed and arranged to yieldably engage and retain the straw in an elevated position.*

*8. A sanitary sipping-straw dispenser of the character described comprising a jar adapted to contain straws standing on end therein, a removable upwardly funnel-shaped top with an aperture at the vertex, said funnel-shaped top being adapted to guide the ends of straws being lifted by an ejector into said aperture for exit, a downwardly funnel-shaped cup with an aperture at the vertex, said last-named aperture being narrow enough to prevent straws from falling through but wide enough to permit a portion of the ejector to pass through, said last-named vertex being located near the periphery of the cup and said cup being located within and at the bottom of the jar and said funnel-shaped cup being adapted to position straws over said last-named aperture by gravity, funneling the straws to said last-named aperture, a straight guide vertically positioned within the jar, an ejector with a first portion thereof slidable on and guided by said guide and a second portion extending from said first portion and provided with pin means at its end, said pin means being positioned to pass through the aperture in the cup and being adapted to engage the bottom end of a straw which is positioned above the aperture in the cup, said second portion of the ejector being adapted to lift said engaged straw into the aperture in the top, means by which the user may actuate said ejector, two similar cantilever springs attached to the top on opposite sides of said aperture therein, said springs having rough clasping edges at a slight horizontal angle to each other, with said clasping edges positioned immediately above the aperture in the top and projecting into the path of the straw or straws being lifted through the aperture in the top so that a single straw will cause said springs to deflect, creating a spring force that will retain said straw and prevent it from falling by its own weight back into the jar, and said clasping edges at an angle to each other causing only the straw on the side where the edges are closer together to be clasped and retained when two straws are lifted into the aperture in the top, and a closure plug adapted to fit into the aperture in the cup from the bottom side to support the straws so that the engaging portion of the ejector may push said straws aside and pass down through said last-named aperture, thus preventing the engaging portion of the ejector from crushing the end of a straw against the edge of said aperture in the cup when said engaging portion passes downwardly therethrough, and a spring adapted to push said closure plug upwardly.*

*9. A straw dispenser attachment comprising a downwardly funnel-shaped positioning cup with an aperture at its vertex, said vertex being located near the periphery of said cup and said cup being adapted to position the bottom ends of straws over said aperture by gravity, funneling the bottom ends of the straws toward said aperture, a straight slender guide vertically positioned at the edge of the cup adjacent the aperture with its bottom end attached to said cup, an ejector having a first portion slidable on and guided by said guide, cooperating means on said ejector and guide limiting rotation of said ejector with respect to said guide, said ejector having a second portion extending from the first portion and provided with upstanding pin means, said second portion being arranged so that said pin means is a short distance beneath the cup when the ejector is at its bottom position and aligning said pin means so that it may pass through the aperture in the cup, said pin means being adapted to engage the bottom end of a straw positioned above the aperture in the cup, said second portion being formed and arranged to lift the engaged straw, means to actuate said ejector, and spring means secured to and depending from said cup to resiliently support the cup and being adapted to allow the cup to oscillate responsive to an impact caused by a part of the ejector and actuating means assembly hitting against a part of the guide and cup assembly upon operation of the device, whereby straws supported on said cup will be agitated and will tend to gravitate toward the vertex of the cup.*

*10. A sanitary sipping-straw dispenser of the character described comprising a jar adapted to contain straws standing on end therein, a removable upwardly funnel-shaped top on the jar with an aperture at the vertex thereof, said top being adapted to cammingly guide the top ends of straws upwardly into said aperture, a downwardly funnel-shaped cup in the jar below said top, said cup having an aperture at its vertex, said last-named aperture being narrow enough to prevent straws from falling through, said vertex of the cup being located near the periphery of the cup and in the lower portion of the jar and said cup being adapted to position straws over said last-named aperture by gravity, funneling the straws to said last-named aperture, a straight slender guide vertically positioned within the jar, an ejector with a first portion slidably mounted on and guided by said guide and having a second portion extending from said first portion and provided with upright pin means at its end, said upright pin means being positioned and aligned to pass through said last-named aperture and being formed and arranged to engage the bottom end of a straw positioned above said last-named aperture, said second portion of the ejector being adapted to lift said engaged straw into the aperture in the top, said ejector being located so as to engage with the cup to deliver an impact thereto responsive to downward movement of said ejector, whereby to cause said cup to oscillate, means for actuating said ejector, and spring means engaging the interior of the jar and resiliently supporting the cup and being adapted to allow said cup to oscillate responsive to an impact caused by a part of the ejector and actuating means assembly hitting against a part of the guide and cup assembly upon operation of the device, whereby the straws supported on said cup will be agitated and will tend to gravitate toward the vertex of the cup.*

*11. The structure of claim 10, and straw retaining means on the top.*

*12. A straw dispenser attachment comprising a downwardly funnel-shaped positioning cup with an aperture at its vertex which is offset, said cup being adapted to position the bottom ends of straws over said aperture by gravity, funneling the bottom ends of the straws toward said aperture, a straight slender guide vertically positioned at the edge of the cup and near the aperture with its bottom end attached to said cup in a manner so as to form a unitary assembly with said cup, an ejector having a first portion slidably mounted on and guided by said guide, said ejector having a second portion extending from the first portion and provided with upstanding pin means, said second portion being arranged so that said pin means is a short distance beneath the cup when the ejector is at its bottom position and aligning said pin*

*means so that it may pass through the aperture in the cup, said pin means being adapted to engage the bottom end of a straw positioned above the aperture in the cup, said second portion being formed and arranged to lift the engaged straw, means for actuating said ejector, and means yieldably supporting the cup and being adapted to allow the cup to shake responsive to an impact caused by a part of the ejector and actuating means assembly hitting against a part of the cup and guide assembly upon operation of the device, whereby straws supported on said cup will be agitated and will tend to gravitate toward the vertex of the cup.*

*13. A sanitary sipping-straw dispenser of the character described comprising a jar adapted to contain straws standing on end therein, a removable upwardly funnel-shaped top on the jar with an aperture at the vertex thereof, said top being adapted to cammingly guide the top ends of straws upwardly into said aperture, a downwardly funnel-shaped positioning cup in the jar below said top, said cup not being attached to the jar, said cup having an aperture at its vertex which is offset, said vertex of the cup being located in the lower portion of the jar and said cup being adapted to position the bottom ends of straws over said last-named aperture by gravity, funneling the bottom ends of the straws to said last-named aperture, a straight slender guide vertically positioned within the jar at the edge of the cup and near the last-named aperture and with its bottom end disposed in close conjunction with the positioning cup so as to form a unitary assembly with said cup, an ejector with a first portion slidably mounted on and guided by said guide, said ejector having a second portion extending from said first portion and provided with upright pin means, said upright pin means being positioned and aligned to pass through said last-named aperture and being formed and arranged to engage the bottom end of a straw positioned above said last-named aperture, said second portion of the ejector being adapted to lift said engaged straw into the aperture in the top, means for actuating said ejector, and means yieldably supporting the cup and being adapted to allow said cup to shake responsive to an impact caused by a part of the ejector and actuating means hitting against a part of the cup and guide assembly upon operation of the device, whereby the straws supported on said cup will be agitated and will tend to gravitate toward the vertex of the cup.*

*14. A sanitary sipping-straw dispenser of the character described comprising a jar adapted to contain straws standing on end therein, a removable upwardly funnel-shaped top on the jar with an aperture at the vertex thereof, said top being adapted to cammingly guide the top ends of straws upwardly into said aperture, a downwardly funnel-shaped positioning cup in the jar below said top, said cup being unattached to the jar, said cup having an aperture at its vertex which is offset from the axis of the cup, said vertex of the cup being located in the lower portion of the jar and said cup being adapted to position the bottom ends of straws over said last-named aperture by gravity, funneling the bottom ends of the straws to said last-named aperture, a straight slender guide vertically positioned within the jar at the edge of the cup and near the last-named aperture and with its bottom end disposed in close conjunction with the positioning cup so as to form a unitary assembly with said cup, said guide being unattached to the jar, an ejector with a first portion slidably mounted on and guided by said guide, said ejector having a second portion extending from said first portion and provided with upright pin means, said upright pin means being positioned and aligned to pass through said last-named aperture and being formed and arranged to engage the bottom end of a straw positioned above said last-named aperture, said second portion of the ejector being adapted to lift said engaged straw into the aperture in the top, means for actuating said ejector, and said assembly which comprises the positioning cup and vertical guide being arranged and adapted to allow said cup to shake responsive to an impact caused by a part of the ejector hitting against a part of said cup and guide assembly upon operation of the device, whereby the straws supported on said cup will be agitated and will tend to gravitate toward the vertex of the cup.*

References Cited in the file of this patent or the original patent

UNITED STATES PATENTS

| | | |
|---|---|---|
| 1,056,330 | Griel | Mar. 18, 1913 |
| 1,124,146 | Kroll | Jan. 5, 1915 |
| 1,191,165 | Eisenhardt | July 18, 1916 |
| 1,211,139 | Griel et al. | Jan. 2, 1917 |
| 1,215,937 | Jandron | Feb. 13, 1917 |
| 1,276,338 | Eisenhardt | Aug. 20, 1918 |
| 1,461,981 | Newman | July 17, 1923 |
| 1,504,599 | Blackwood | Aug. 12, 1924 |
| 1,588,386 | Young | June 8, 1926 |
| 1,589,891 | Mazzoni et al. | June 22, 1926 |
| 2,074,674 | Sadjian | Mar. 23, 1937 |
| 2,212,268 | Ivanoff | Aug. 20, 1940 |
| 2,756,903 | Kreidler | July 31, 1956 |

FOREIGN PATENTS

| | | |
|---|---|---|
| 21,161 | Great Britain | Oct. 23, 1899 |
| 149,472 | Germany | Mar. 21, 1904 |
| 161,368 | Great Britain | Feb. 4, 1920 |
| 637,023 | Germany | Dec. 17, 1936 |